United States Patent [19]

Baginski

[11] Patent Number: 4,624,092
[45] Date of Patent: Nov. 25, 1986

[54] ROOFING MEMBRANE FASTENER

[75] Inventor: Albert R. Baginski, Torrance, Calif.

[73] Assignee: Illinois Tool Works Inc., Chicago, Ill.

[21] Appl. No.: 663,297

[22] Filed: Oct. 22, 1984

[51] Int. Cl.[4] .............................................. E04B 1/38
[52] U.S. Cl. ...................................... 52/713; 24/459;
52/410; 411/525
[58] Field of Search ................. 52/713, 410, 512, 747;
24/459, 462; 248/237; 411/525, 526, 528

[56] References Cited

U.S. PATENT DOCUMENTS

| 1,849,604 | 3/1932 | Weatherhead, Jr. | 411/521 X |
| 3,426,412 | 2/1969 | Streng et al. | 24/461 |
| 3,643,987 | 2/1972 | DuPont | 411/526 X |
| 3,796,124 | 3/1974 | Crosa | 411/521 |
| 4,057,095 | 11/1977 | Hirota | 160/392 |
| 4,221,028 | 9/1980 | Fischer | 24/457 |
| 4,378,616 | 4/1983 | Fischer et al. | 24/459 |
| 4,502,256 | 3/1985 | Hahn | 24/459 X |
| 4,519,175 | 5/1985 | Resan | 52/713 |

FOREIGN PATENT DOCUMENTS

| 56934 | 8/1982 | European Pat. Off. | 24/462 |
| 2400140 | 7/1975 | Fed. Rep. of Germany | 52/506 |
| 2711335 | 9/1978 | Fed. Rep. of Germany | |
| 341960 | 12/1959 | Switzerland | 135/119 |

Primary Examiner—William F. Pate, III
Assistant Examiner—Jean M. La Kemper
Attorney, Agent, or Firm—David I. Roche; Thomas W. Buckman

[57] ABSTRACT

A two part fastener is provided for securing an elastomeric membrane on a roof deck or the like. The fastener includes a post secured to the roof deck by a screw and having a peripheral laterally extending flange at the upper edge. The membrane is draped over the post and a ring is installed over the membrane and post. The ring includes a plurality of inwardly and upwardly directed resilient fingers lying on a conical surface. The fingers snap over and then lock beneath the membrane and flange. The upper end of the post is recessed so that part of the membrane can be stretched into it during assembly and then released to reduce stress in the membrane.

12 Claims, 11 Drawing Figures

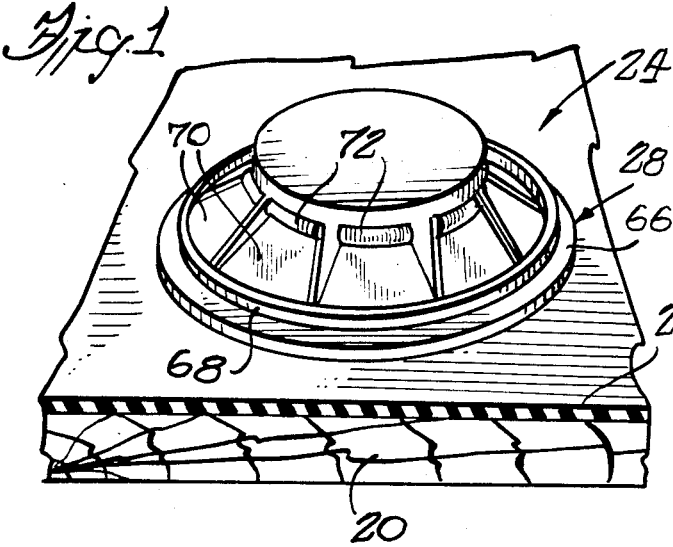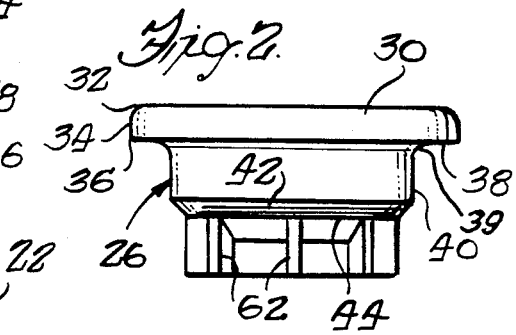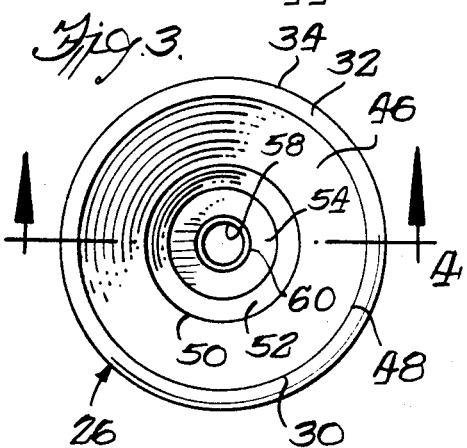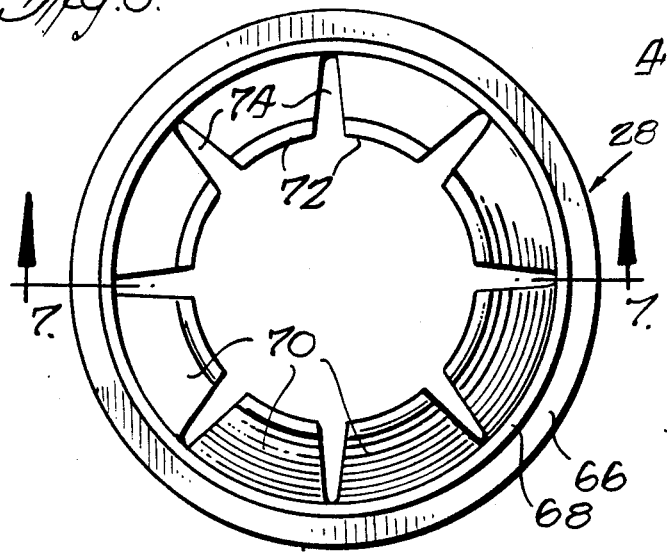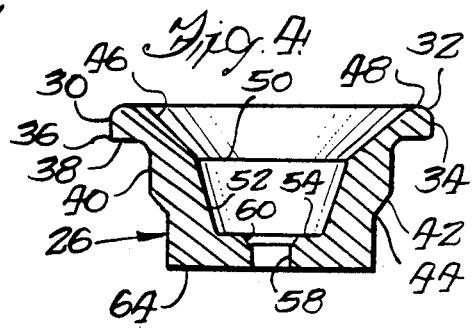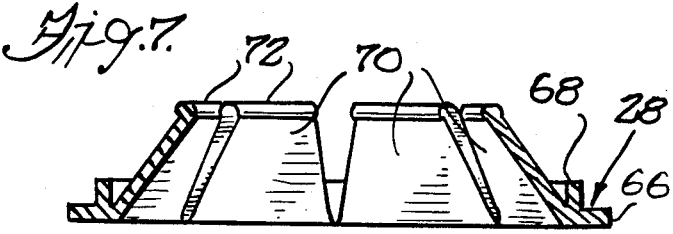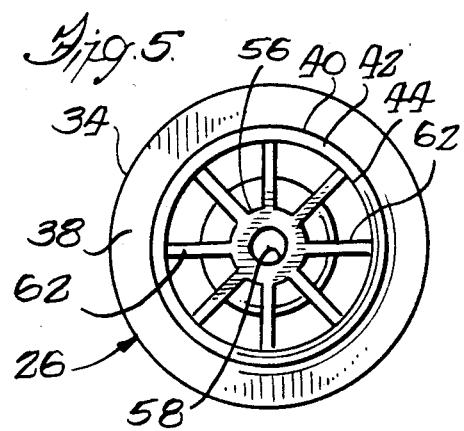

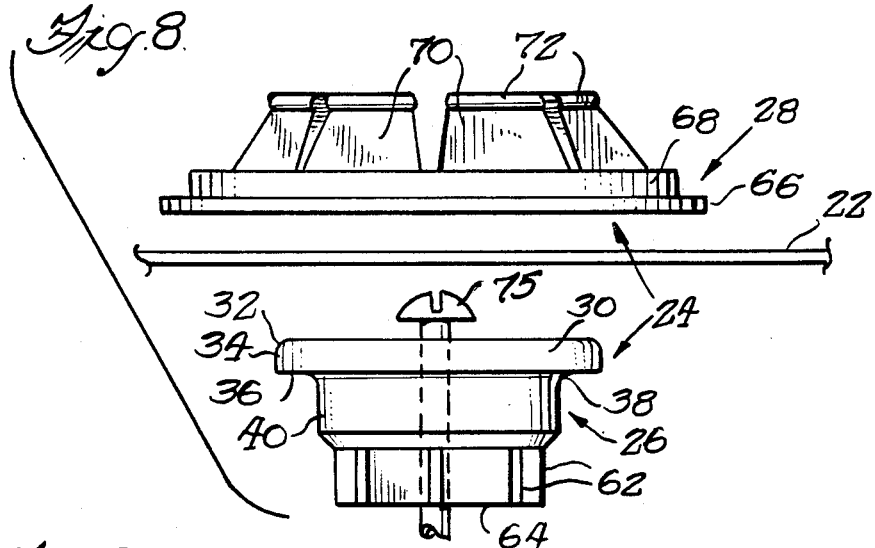
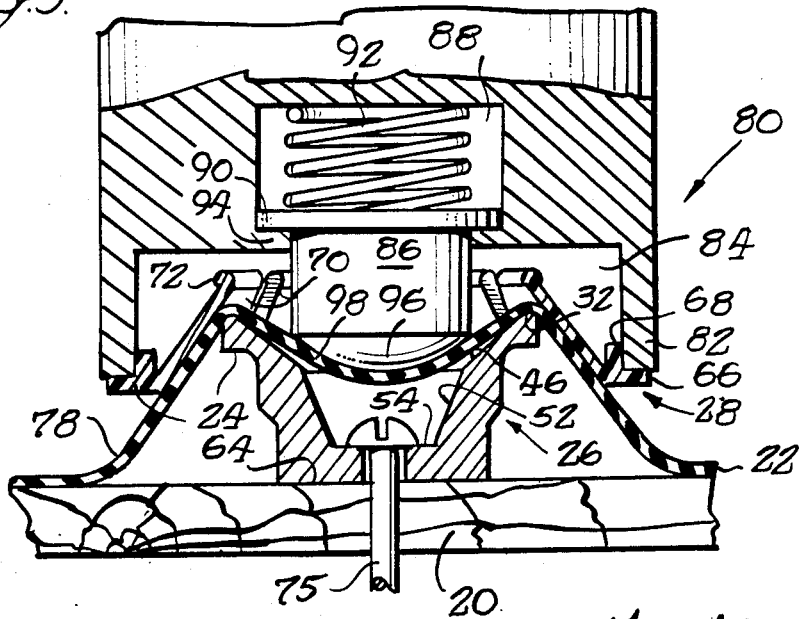
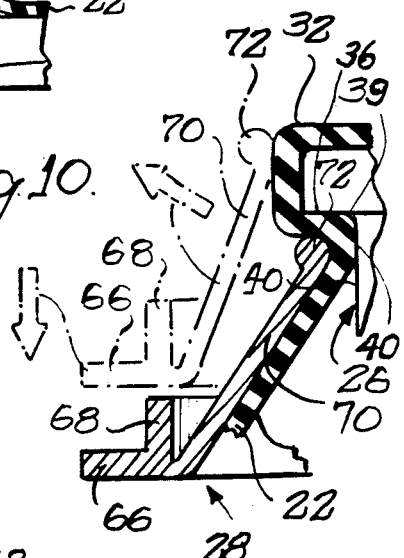
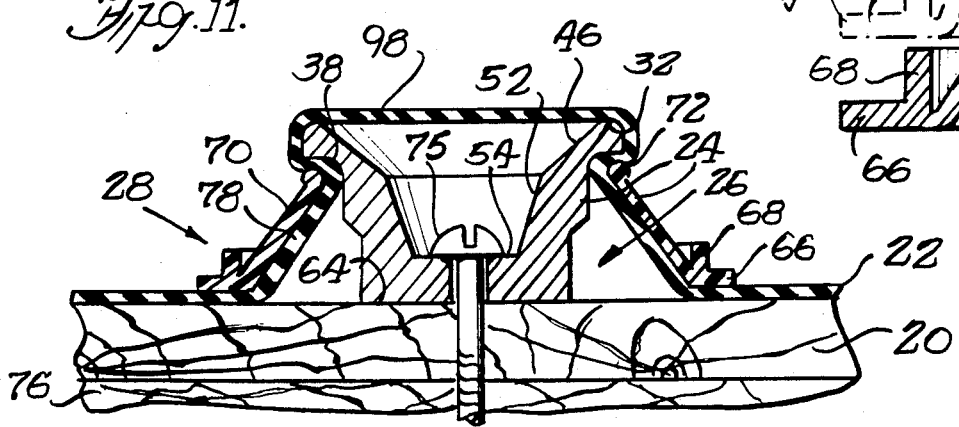

ROOFING MEMBRANE FASTENER

BACKGROUND OF THE INVENTION

A common factor in roof construction is the necessity of waterproofing thereof. Waterproofing is usually accomplished by application of a waterproof membrane. The membrane may be a built-up membrane of roofing paper and asphalt or bitumin, or it may be a continuous sheet of plastic resin material or of rubber or other synthetic elastomer. In a built-up membrane the asphalt or bitumin secures the membrane to the underlayment, which may be the roof deck or insulating panels on top of the roof deck. With plastic resin or elastomeric continuous membranes the membranes may be secured to the roof deck or other underlayment by means of a suitable adhesive, or by means of ballast placed on top of the membrane. It is important that no fastener penetrate the membrane, as this could lead to leakage and to tearing of the membrane.

The present invention is concerned with a roof construction utilizing a continuous synthetic rubber membrane. The membrane may be applied over a new roof deck, or over an existing roof deck and whatever membrane is already in place, and which may be a built-up roof.

Various structures are known in the prior patent art for securing a rubber or the like membrane to a roof without piercing the membrane. Such prior art includes West German Pat. No. 2,711,335 and U.S. Pat. Nos. 3,426,412; 4,057,095; and 4,221,028.

OBJECTS AND SUMMARY OF THE PRESENT INVENTION

The broad object of the present invention is to provide an improved fastener for a roofing membrane which fastener does not penetrate the membrane.

More particularly, it is an object of the present invention to provide a two piece fastener for a roofing membrane in which one piece of the fastener is secured to the roof before the membrane is applied, and wherein the other piece is applied over the membrane and has a plurality of gripping fingers for holding the membrane to the first piece.

In attaining the foregoing and other objects of the present invention I provide a first fastener piece or post which is secured to a roof deck by means such as a screw. The central portion of the post is recessed relative to the rim thereof so that a portion of the membrane may be stretched into the top portion of the post before gripping by the second portion of the fastener, whereby to minimize stresses in the membrane. Furthermore, this recessing of the mounting screw isolates the screw from engagement by the membrane, which engagement might damage the membrane. The post furthermore is provided with a plurality of radially extending flanges which stabilize the post on the roof deck and reinforce the other portions of the post.

The fastener further includes a gripping ring which lies over the membrane, and which has a plurality of resilient fingers which snap over a peripheral rim at the top of the post after the membrane has been laid over the post, whereby to grip the membrane against the post beneath the rim. The upper ends of the fingers are thickened and rounded to ensure good gripping of the membrane against the rim without damage to the membrane.

THE DRAWINGS

The invention will best be understood with reference to the following specification when taken in connection with the accompanying drawings wherein:

FIG. 1 is a perspective view of a fastener constructed in accordance with the present invention as assembled with a roof deck and waterproof membrane, the roof deck and membrane being shown in fragmentary cross-section;

FIG. 2 is a side view of the post forming a part of the present fastener shown on a somewhat enlarged scale as compared with FIG. 1;

FIG. 3 is a top view of the post of FIG. 2;

FIG. 4 is an axial sectional view through the post taken along the line 4—4 in FIG. 3;

FIG. 5 is a bottom view of the post;

FIG. 6 is a top view of the ring forming the second part of the present fastener, shown on the same scale as the post of FIGS. 2-5;

FIG. 7 is an axial sectional view through the ring as indicated by the line 7—7 in FIG. 6;

FIG. 8 is an exploded side view of the two parts of the fastener and of the membrane to be associated therewith;

FIG. 9 is an axial sectional view showing the two parts of the fastener and the membrane as partially assembled, and also including an assembling tool;

FIG. 10 is a fragmentary axial sectional view similar to a part of FIG. 9 and showing coaction of the parts as assembled; and FIG. 11 is an axial sectional view through the two piece retainer in assembled position with the roofing membrane.

DETAILED DESCRIPTION OF THE ILLUSTRATED EMBODIMENT

Turning now to the drawings in greater detail, and first to FIG. 1 there will be seen a roof deck 20 simply illustrated as comprising wood boards or the like. It will be understood that this is simply exemplary, and that the roof deck could be of concrete, or steel, or could include foam plastic insulation on top of the supporting wood, concrete or steel deck. A waterproof and weather resistant membrane 22 of synthetic rubber or other suitable elastomer or plastic resin lies on top of the roof deck 20 and is held in place by a plurality of two piece fasteners 24, only one of which is shown.

Each fastener 24 includes a post 26 (FIGS. 2-5) and a ring 28 (FIGS. 1, 6 and 7). The ring 28 is made of a suitable plastic resin having high strength, low creep, and good weather resistance. Preferred examples include the acetal copolymer sold under the trademark "CELCON", by Celanese Corp., and the acetal resin sold under the trademark "DELRIN", by E. I. Du Pont de Nemours & Co., Inc. The post 26 may be made of the same material, or one of lesser quality and expense, since it is not exposed to the weather.

The post 26 includes an upper, outer rim 30 having a smoothly rolled upper outer corner or edge 32. From this rounded upper edge the rim descends as a cylindrical wall 34 to a right angle shoulder 36 formed with a flat underlying surface or wall 38. The wall 38 is joined by a smooth internal curve 39 to a cylindrical wall 40 having an underlying tapered or frustoconical surface 42 terminating at a lower edge 44. A frustoconical surface 46 extends downwardly and inwardly from the top surface 48 of the rim 30, forming a smooth curve therewith. The frustoconical or dished surface 46 forms a junction at 50 with a more steeply pitched frustoconical surface 52 which terminates in a horizontal, flat surface 54. The horizontal surface is provided centrally thereof with a depending tubular portion 56 having a bore 58 therein for receipt of a screw as will be noted hereinafter. The junction between the flat surface 54 and the bore 58 preferably is beveled as indicated at 60. The post is completed by a plurality of radially extending flanges or fins 62 having horizontal lower edges 64 forming a base for the post, and also extending between the inner surface of the cylindrical wall 40 and the outer surfaces of the frustoconical surfaces 46 and 52, thereby reinforcing the post. All of the parts of the post as heretofore set forth comprise an integral elastic molding.

The ring 28 (FIGS. 1, 6 and 7) is also an integral plastic molding which is of high strength, low creep, and good weather resistance qualities, as heretofore noted. The ring comprises a flat, circumferentially continuous outer rim 66 having near its inner margin a cylindrical upstanding flange 68 which reinforces the rim 66 and renders the ring 28 resistant to bending and other distortion. From the inner margin of the rim 66 a plurality of closely spaced fingers 70 extend diagonally inwardly and upwardly. The fingers are generally trapezoidal in form, although the upper and lower margins are curved, and the bodies of the fingers are somewhat arched. The free, upper ends 72 of the fingers are enlarged or bulbous, presenting a mostly cylindrical configuration to avoid stress on the membrane with which the fastener is assembled. As will be seen particularly in FIG. 6, the upper ends 72 of the fingers lie on the circumference of a circle, interrupted by narrow, wedge-shaped spaces 74 between the fingers, including the upper ends or tips thereof.

Assembling of the membrane 22 with the fastener 24 is illustrated in FIGS. 8–10. A screw 75 extends through the bore 58 in the post 26, and is screwed into the roof deck 20. As shown in FIG. 11 the screw may be rather long and extend through the roof deck 20 into a supporting beam 76 or other underlying structure. The screw may of course be shorter and extend only into the roof deck 20. The screw is indicated as a round head screw, but a beveled screw could be used with the underside of the head interfitting with the bevel 60 and the top of the head then being flush with the surface 54 of the post.

The membrane 22 is positioned above a plurality of posts 26, as shown in connection with one post in FIG. 8. The membrane then is lowered into engagement with the roof deck 20, with a portion 78 thereof extending up in generally conical shape over the top of the post. The ring 28 is positioned over this conical portion of the membrane and centered relative to the post 26. An installation tool 80 shown in FIG. 9 then is brought into engagement with the ring, and includes an outer cylindrical wall 82 which engages the rim 66 of the ring, while encircling the upstanding flange 68 thereon. The depending cylindrical wall 82 provides a central recess 84 in the tool 80, and a central bore mounts a cylindrical stud, finger or presser member 86 depending into the recess 84. The central bore, hereinafter identified at 88, mounts an enlarged flat head 90 of the finger. A compression spring 92 within the bore 88 presses down on the head 90, and an inwardly directed flange 94 limits downward movement of the head 90 and hence of the finger 86. The lower end of the finger is domed at 96.

As the domed lower end 96 of the finger 86 presses against the top portion 98 of the membrane 22 centrally of the conical portion 78 thereof the membrane is stretched over a rather large local area, thereby minimizing the stress caused by such stretching. Downward movement of the central portion 98 of the membrane and of the finger 86 is limited by the frustoconical surface 46 of the post 26, the spring 92 thereafter compressing as the cylindrical wall 86 forces the ring 28 down.

The fingers 70 flex outwardly in the manner of cantilever springs as shown in broken lines in FIG. 10 moving a part of the membrane into conformity with the rim 30. Ultimately the fingers pass beneath the rim 30 and press the membrane into the curved area between the undersurface 36 of the rim and the subjacent cylindrical wall 40 as shown in solid lines in FIG. 10. The tool 80 then is moved upwardly away from the ring and the membrane, and the central portion 98 moves up to a flat position as shown in FIG. 11, releasing some of the stretching stress in the membrane and enhancing the service life of the membrane. The frustoconical portion 78 of the diaphragm engages the inner surfaces of the fingers 70, while the bulbous ends 72 of the fingers hold the membrane against the curved surface 39 with a minimum of stress on the membrane.

It will be understood that the membrane will be secured by a plurality of fasteners as just described, the spacing depending somewhat on the environment. For example, more fasteners will be needed in a windy area than in a calm area if it is assumed that no ballast is placed over the membrane. The two parts of the fastener are relatively sized so that there is little or no bending force on the fingers when the fastener is in assembled condition with the membrane, most of the forces being lengthwise of the fingers from the upper ends down toward the roots. Thus, the fastener is under very little stress except that imposed by winds trying to raise the membrane, and substantially the only factor limiting service life therefore is weathering of the ring portion of the fastener. Suitable choice of plastic material as heretofore set forth provides a service life of the fastener at least equal to that of the membrane, the latter being made of a suitable synthetic rubber or elastomer.

The specific example of the present invention as herein shown and described is for illustrative purposes. Various changes in structure will no doubt occur to those skilled in the art, and will be understood as forming a part of the present invention insofar as they fall within the spirit and scope of the appended claims.

The invention is claimed as follows:

1. A two part fastener for a resilient membrane such as for roofing and comprising a post having upper lateral protuberance means and a recessed upper surface having an upper relatively shallow frustoconical surface and a lower relatively steep frustoconical section, means for securing said post to a supporting surface such as a roof deck, a resilient membrane being drapeable over said post, and a retaining ring telescopible over said post and a membrane draped over said post, said ring having a rim adapted to rest on a membrane on said supporting surface, and an open-top substantially frustoconical section comprising a plurality of arcuately spaced fingers extending upwardly and inwardly from said rim and having an enlarged upper edge, said section being radially resilient to permit said upper edge to pass over said post lateral protuberance means and a membrane thereon and to engage beneath said protuberance means to grip a membrane.

2. A fastener as set forth in claim 1 wherein said rim has upper and lower flat surfaces.

3. A fastener as set forth in claim 2 wherein said rim has an axially extending cylindrical section upstanding therefrom.

4. A fastener as set forth in claim 1 wherein said rim has an axially extending cylindrical section upstanding therefrom.

5. A fastener as set forth in claim 1 wherein the upper edge of said substantially frustoconical section comprises a bulbous enlargement.

6. A two part fastener for a resilient membrane such as for roofing and comprising a post having upper lateral protuberance means at an upper end thereof, means at a lower end of said post for securing said post to a supporting surface such as a roof deck, said post having an upper surface with a recess therein, said recess tapering inwardly from said upper end thereof to said lower end thereof, a resilient membrane being drapeable over said post, and a retaining ring telescopible over said post and a membrane draped over said post, said ring having a rim adapted to rest on a membrane on said supporting surface, and a plurality of resilient fingers extending inwardly and upwardly from said rim, said fingers having upper ends adapted to pass over said lateral protuberance means and a membrane thereon and to engage beneath said protuberance means to grip a membrane.

7. A fastener as set forth in claim 6 wherein said rim has upper and lower flat surfaces.

8. A fastener as set forth in claim 7 wherein said rim has a cylindrical section upstanding therefrom.

9. A fastener as set forth in claim 6 wherein said rim has an axially extending cylindrical section upstanding therefrom.

10. A fastener as set forth in claim 6 wherein the upper ends of said fingers comprise bulbous enlargements.

11. A fastener as set forth in claim 6 wherein said fingers are substantially trapizoidal in shape.

12. A fastener as set forth in claim 11 wherein the upper ends of said fingers comprise bulbous enlargements.

* * * * *